Feb. 23, 1954  E. R. BERGMANN  2,670,071
SHAKER CONVEYER
Filed March 3, 1951  7 Sheets-Sheet 1
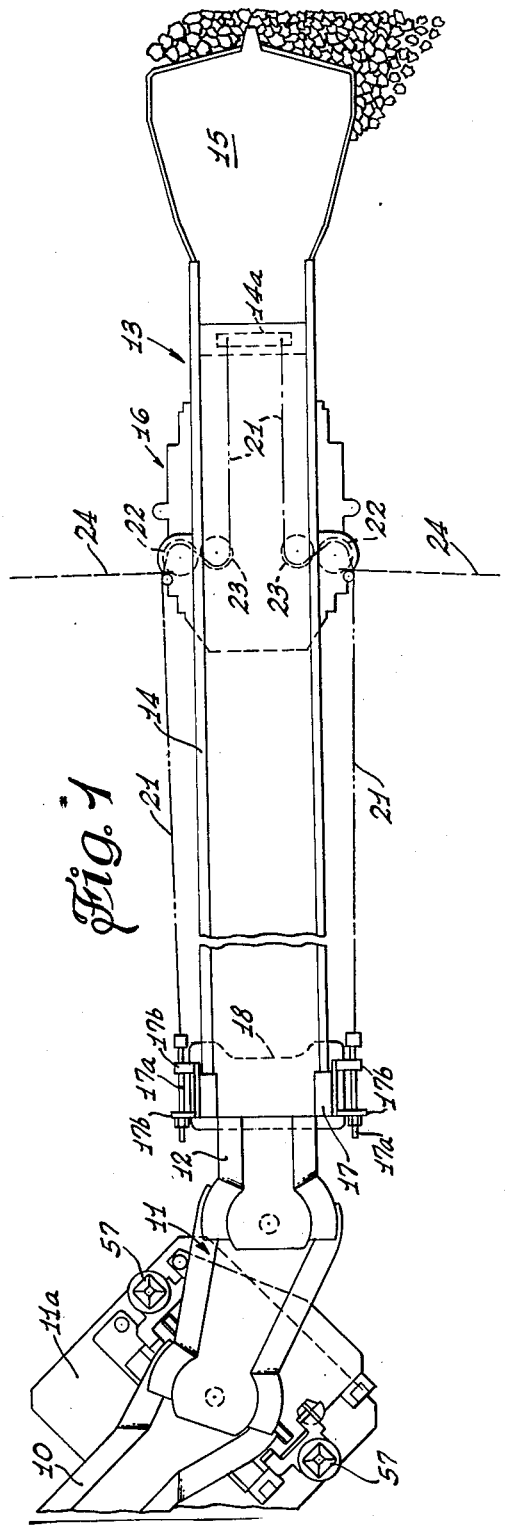
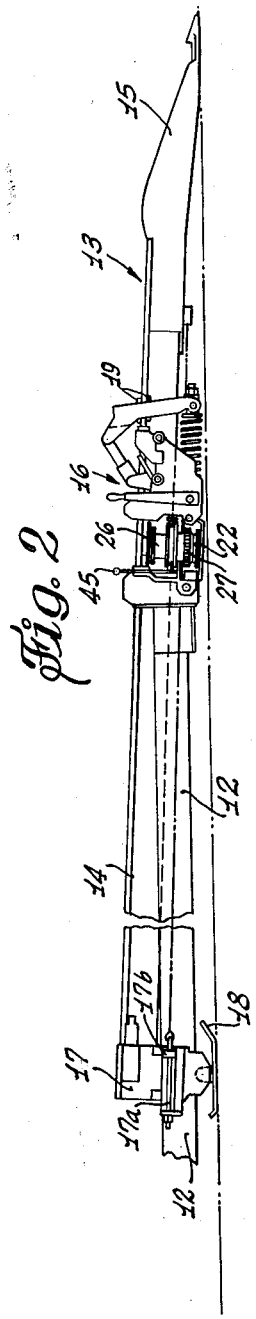
INVENTOR.
Ernst R. Bergmann
BY
Murray A. Gleeson
ATTORNEY

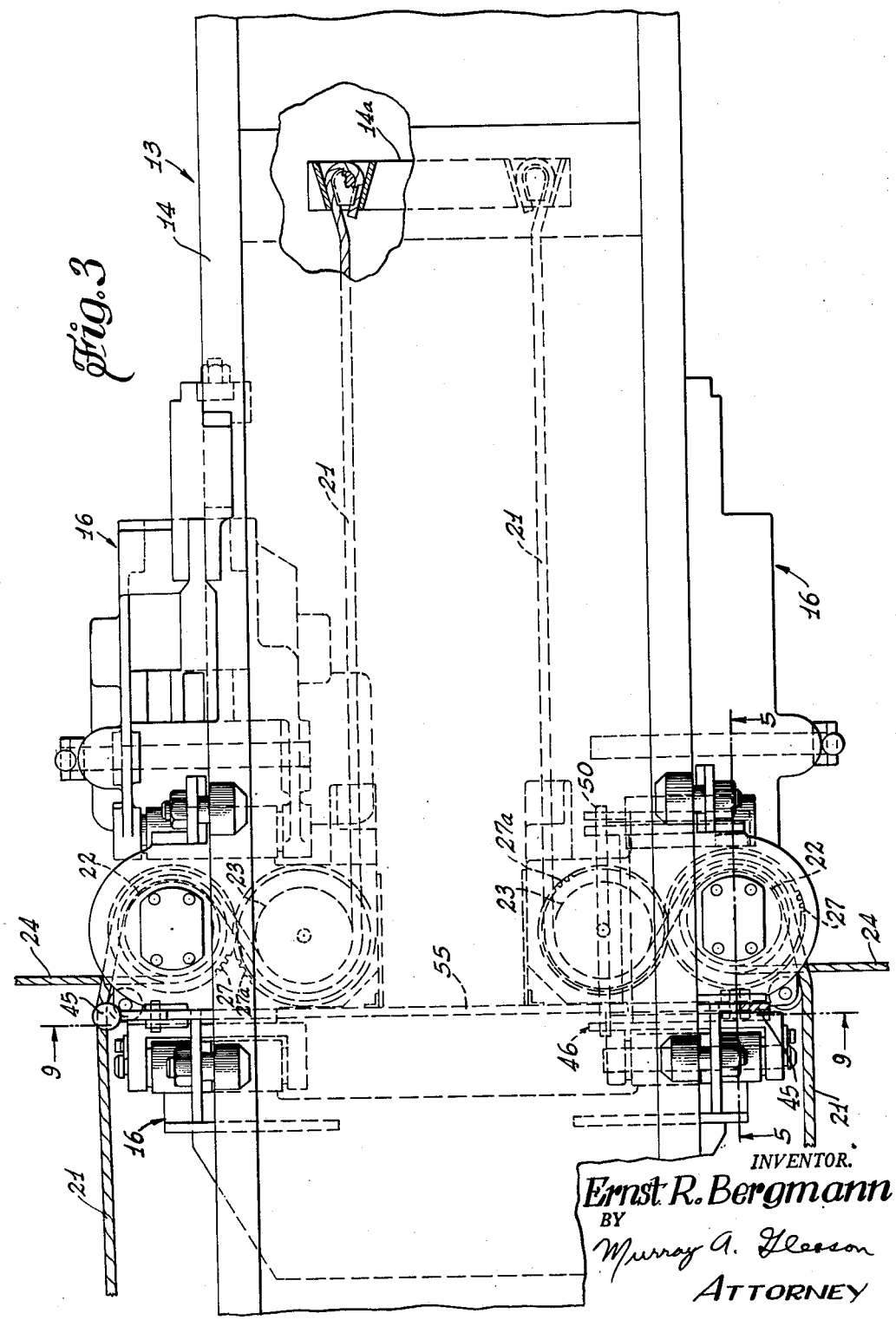

Feb. 23, 1954 E. R. BERGMANN 2,670,071
SHAKER CONVEYER
Filed March 3, 1951 7 Sheets-Sheet 3
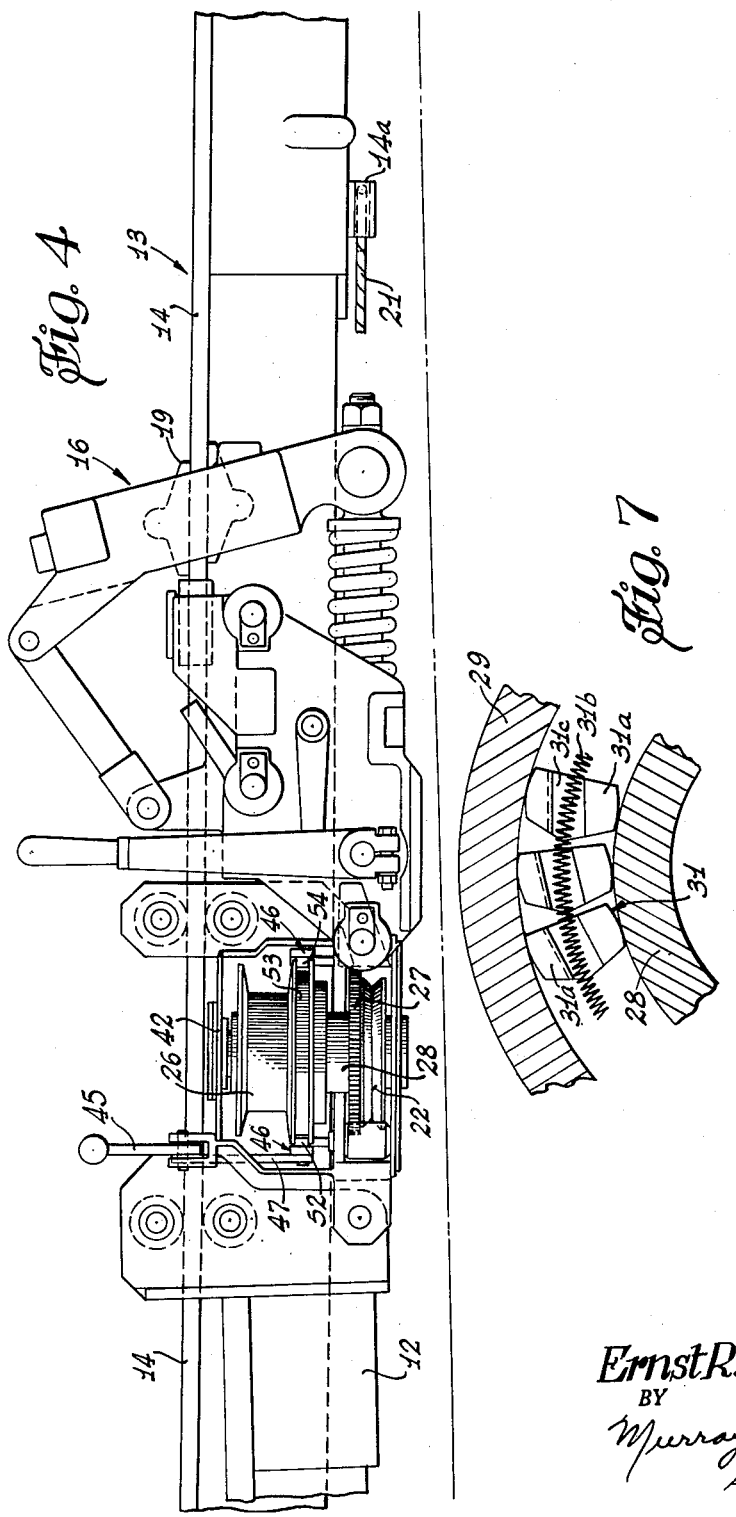
INVENTOR.
Ernst R. Bergmann
BY
Murray A. Gleeson
ATTORNEY

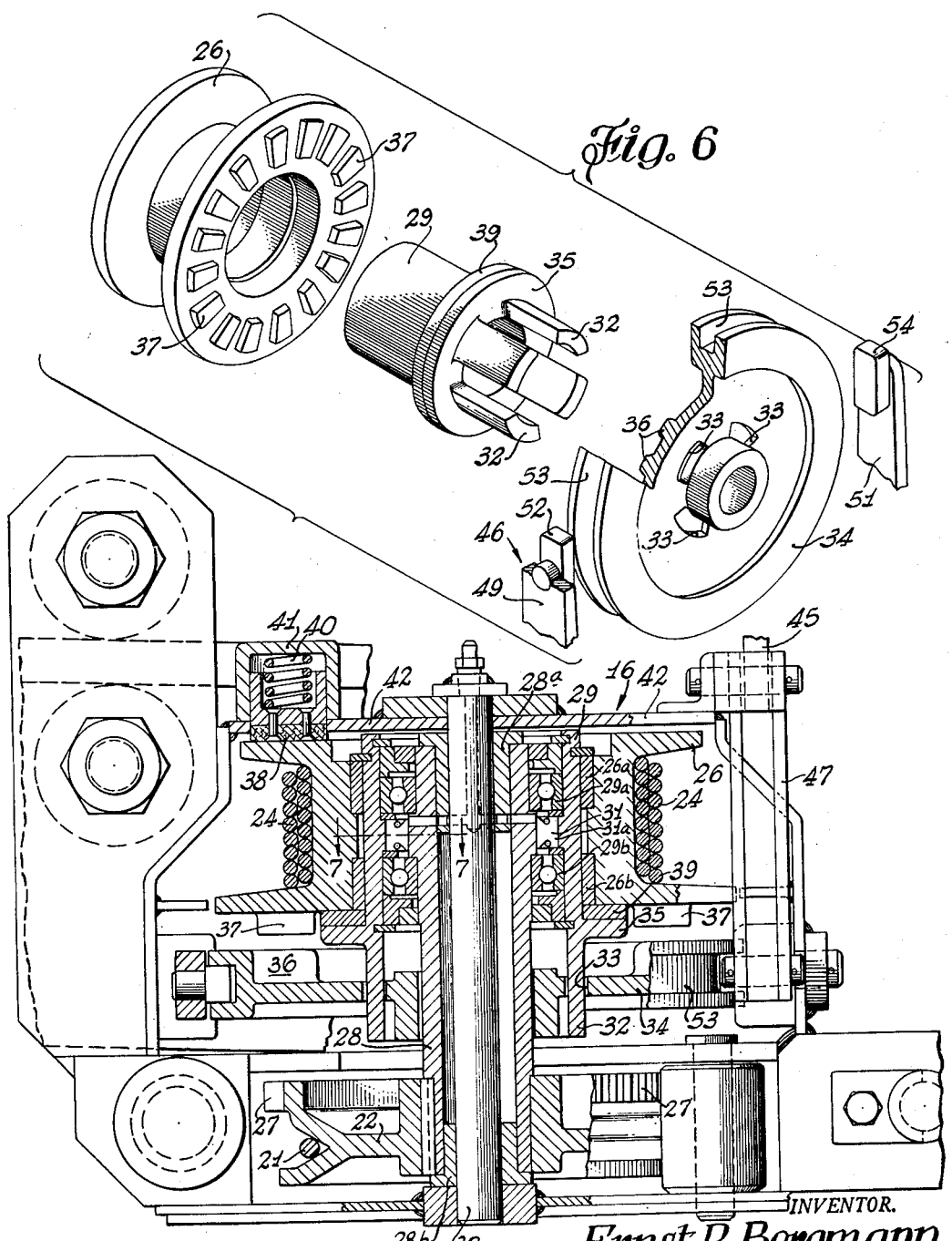

Feb. 23, 1954  E. R. BERGMANN  2,670,071
SHAKER CONVEYER
Filed March 3, 1951  7 Sheets-Sheet 5
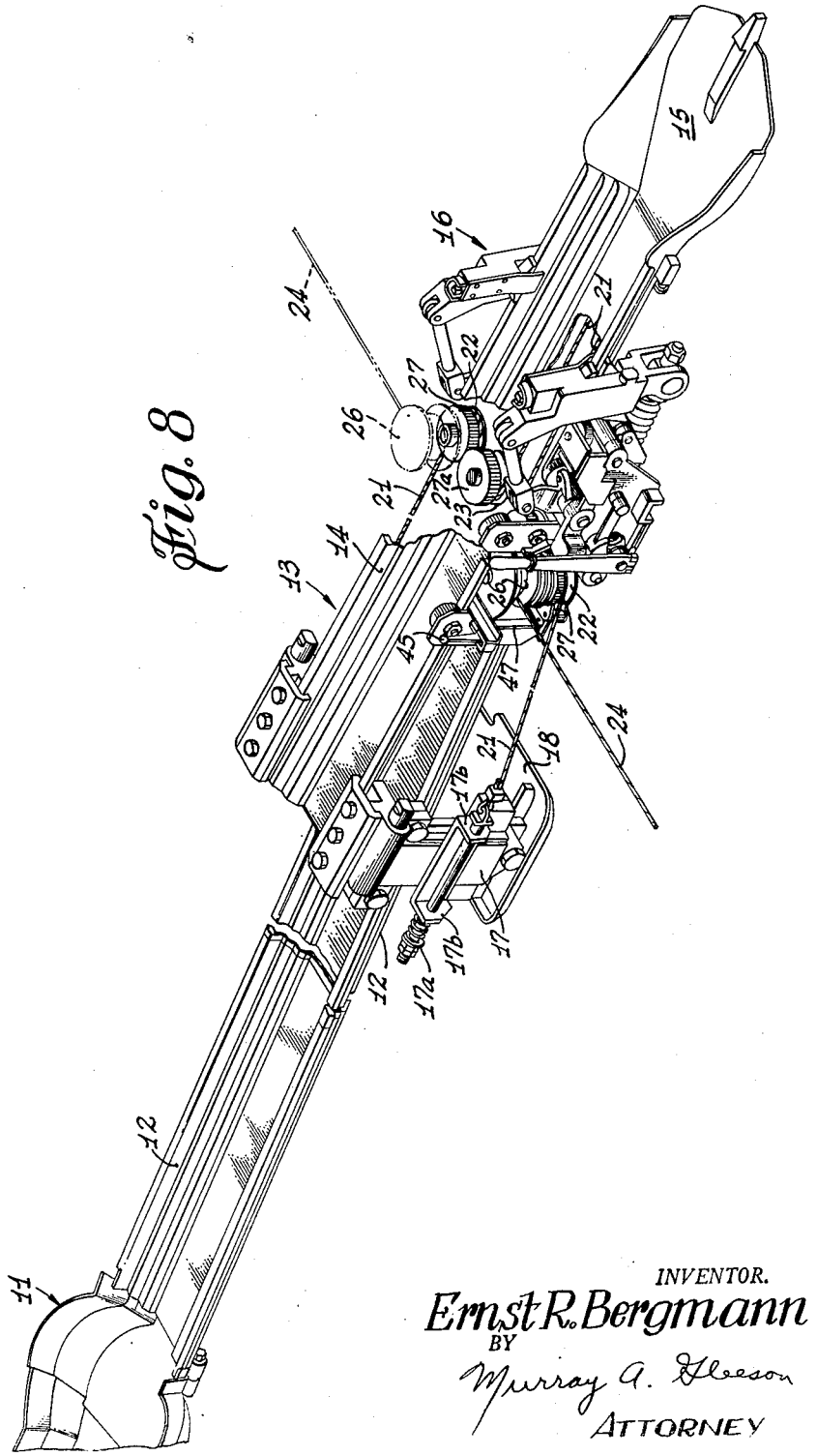
INVENTOR.
Ernst R. Bergmann
BY
Murray A. Gleeson
ATTORNEY

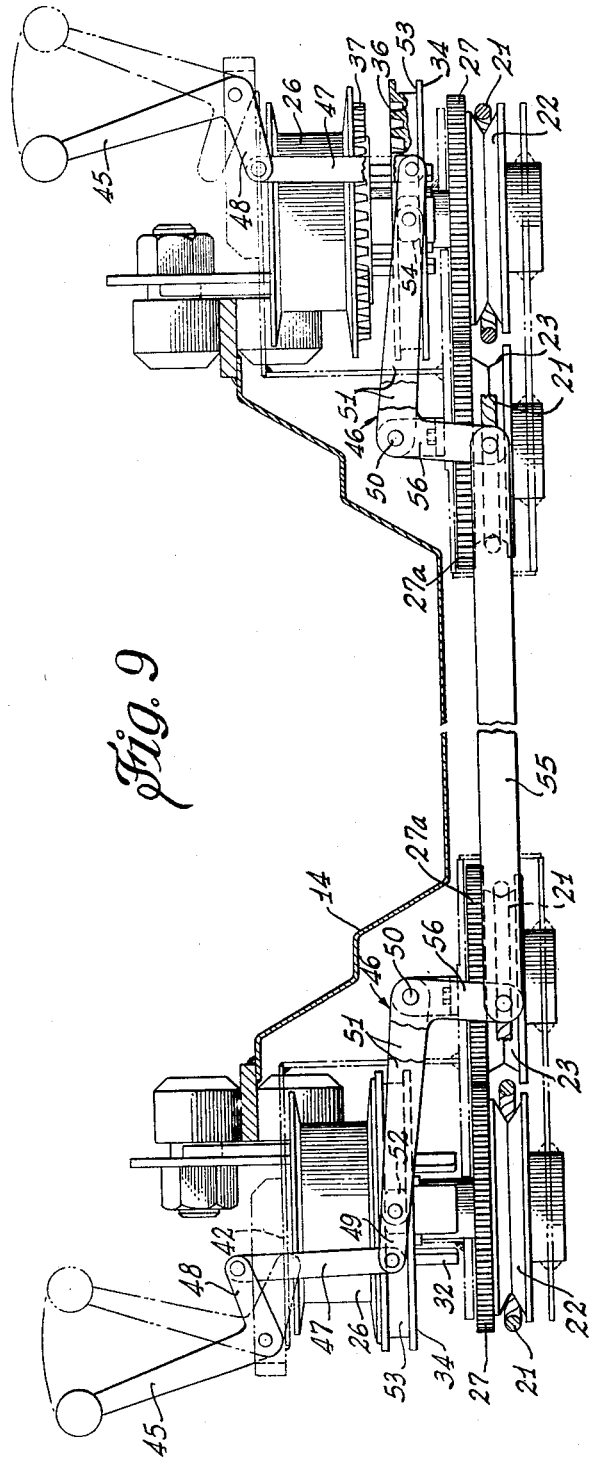

Feb. 23, 1954  E. R. BERGMANN  2,670,071
SHAKER CONVEYER
Filed March 3, 1951  7 Sheets-Sheet 7
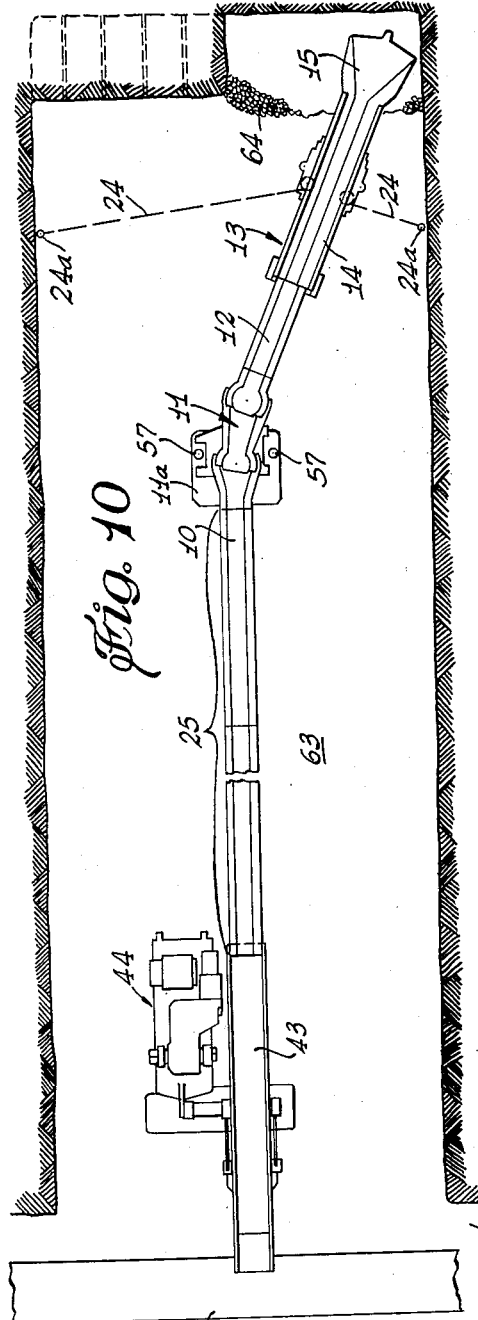
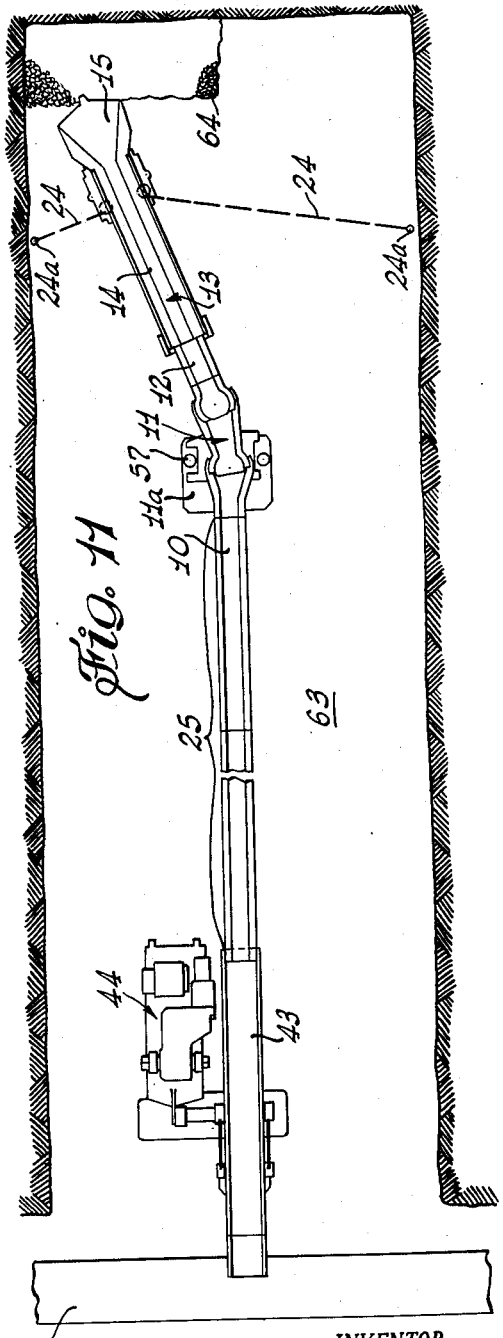
INVENTOR.
Ernst R. Bergmann
BY
Murray A. Gleeson
ATTORNEY Patented Feb. 23, 1954

2,670,071

UNITED STATES PATENT OFFICE 2,670,071

SHAKER CONVEYER

Ernst R. Bergmann, Chicago, Ill., assignor to Goodman Manufacturing Company, Chicago, Ill., a corporation of Illinois Application March 3, 1951, Serial No. 213,749

15 Claims. (Cl. 198—220)

This invention relates to improvements in extensible feeding heads for shaker conveyors, and more particularly to sluing mechanisms for such devices.

The principal object of the present invention is to provide a simple and efficient draft mechanism associated with the feeding device and actuated by relative movement between the main conveyor and the feeding head, for selectively drawing in flexible cables suitably anchored to abutments at opposite sides of the feeder head, whereby the feeder head may be slued at will toward one side or the other for loading loose material at varying angles to the main trough line of the conveyor.

A further object of the invention is to provide a draft mechanism of the character above described, including means for maintaining the draft cables in taut condition at times when they are not being positively actuated for sluing the feeder head.

Other objects of the invention will appear from time to time as the following description proceeds.

The invention may best be understood by reference to the accompanying drawings, in which:

Figure 1 is a plan view of a feeder head and a portion of an associated shaker conveyor trough line, including a swivel or articulating joint therefor, and showing my novel form of sluing device for the loading head as it may be employed in a mine;

Figure 2 is a fragmentary side view of the loader head and sluing device shown in Figure 1, with portions of the troughs broken away;

Figure 3 is an enlarged detailed plan view of the main portion of the loader head on which the sluing mechanism is mounted;

Figure 4 is a side view of the portion of the loader head and sluing mechanism shown in Figure 3;

Figure 5 is an enlarged detailed section taken generally on line 5—5 of Figure 3;

Figure 6 is a detailed perspective view of certain parts of the sluing mechanism in exploded relation to each other;

Figure 7 is an enlarged detailed section of the one-way clutch mechanism taken on line 7—7 of Figure 5;

Figure 8 is a cut-away, perspective view of the loading head shown in the previous views;

Figure 9 is an enlarged detail section taken generally on line 9—9 of Figure 3;

Figure 10 is a diagrammatic plan view of a shaker conveyor trough line, incorporating the present invention, shown as it would be employed in loading out shot down material from one side of a mine face; and Figure 11 is a view similar to Figure 10, showing the loading head slued to the opposite side of the room to load out material from that side.

Referring now to details of the embodiment of my invention shown in the drawings, Figure 1 shows a main trough 10 of a shaker conveyor, connected through a conventional swivel or articulated joint 11 to a feeder trough section 12 forming part of a loader head indicated generally at 13. The trough 10 is reciprocably driven as usual by a shaker drive indicated generally as 44 in Figures 10 and 11.

The loading head 13 is also of a well-known type commonly known as a "duckbill," wherein an extensible shovel trough 14, having a shovel 15 fixed on its front end, is telescopically mounted with respect to the reciprocable feeder trough 12. A feeder head 16 is secured as usual to the front end of the feeder trough 12 and is adapted to ride on the extensible shovel trough 14 intermediate the ends of the latter during telescopic movement of the two troughs. The extensible trough 14 is supported on the ground at its front end by the shovel 15 and at its rear end by an upright support 17 on a shoe 18. The extensible trough 14 is thus supported in two places in frictional engagement with the ground, so as to tend to remain stationary excepting when engaged by grip blocks 19, 19 carried on the feeder head 16. The relative extension or retraction of the two troughs 12 and 14 is controlled by manipulation of the grip blocks 19, 19 in proper timed relation to the motion of trough 12. The gripping action of blocks 19, 19 may be manually controlled through any well-known linkage mechanism on the loading head, which need not be shown nor described in further detail as it forms no part of the present invention.

Referring now particularly to the general views shown in Figures 10 and 11, the loading head 13 is pivotable about the swivel trough 11 which in turn is connected to the terminal trough 10 of a shaker conveyor pan line 25, the latter being connected to a drive trough 43 which is reciprocably driven by a unit generally designated 44. In the usual or conventional method of mining with this type of equipment, the shaker line discharges onto a main belt conveyor 61 running through an entry 62 adjacent the room 63 which is being mined out. The sluing mechanism of the present invention is effective, through jacked-down ropes or cables 24, 24, to slue the head from side to side as desired.

Referring now more particularly to the sluing mechanism for the feeder head of the type hereinabove described, means are provided for actuating a pair of take-up or winding devices in response to relative telescoping movement of the extensible trough 14 with respect to the reciprocating trough 12. In the form shown herein, this actuating means consists of a pair of flexible cables 21, 21 connected along opposite sides of the extensible trough 14, both ends of each of said cables being anchored respectively at front and rear ends of the extensible trough. In the form shown, the front ends of said cables are anchored in laterally spaced relation to each other and to a transverse support 14a fixed under the front end of trough 14 closely adjacent the shovel 15. The rear ends of said cables are anchored through turnbuckles 17a to ears 17b mounted on opposite sides of the upright support 17 at the rear end of the trough 14.

A pair of winding devices similar to one another are mounted on opposite sides of the feeder head 16 arranged respectively for frictional actuation by the cables 21, 21. Details of the winding devices are shown in Figures 3 to 7, wherein each winding device includes a winding drum 26 disposed on an upright axis and having the sluing cable 24 wound thereon, with a free end adapted to be extended for anchoring to a suitable abutment or jack at one side of the feeder head, so as to swing the feeder head and associated parts of the shaker trough bodily about the swivelling joint 11 when the drum 26 is connected for positive rotation in the proper direction, as will presently be more fully described.

Each of the cables 21 is passed about a drive sheave 22 forming a part of its respective winding device at one side of the feeder head. From thence, the cable 21 passes inwardly about an idler sheave 23 mounted on the main frame of the feeder head. The drive sheave 22 and the idler sheave 23 are interconnected by gear teeth 27, 27a so as to increase the frictional effect of said cable upon said sheaves.

The drive sheave 22 is keyed on the lower end of a driving sleeve 28 rotatably mounted on bearing sleeves 28a and 28b at the upper and lower ends of an upright supporting shaft 30, suitably fixed at its upper and lower ends to the main frame of the feeder head 16, as shown in Figure 5.

The drive sleeve 28 has a clutch sleeve 29 rotatably mounted thereon with a pair of vertically spaced anti-friction bearing members 29a, 29b interposed therebetween. The winding drum 26 is rotatably mounted upon the upper end of the clutch sleeve 29, with a pair of bearing rings 26a, 26b interposed therebetween. In the form shown herein, the latter bearing rings are fixed to and rotate with the drum 26.

The clutch sleeve 29 is driven from the drive sleeve 28 by a one-way clutch 31 located between the upper and lower anti-friction members 29a and 29b. This one-way clutch may be of any suitable construction, in the form shown in detail in Figure 7, consisting of a plurality of sprags 31a surrounding the drive sleeve 28 between the anti-friction members 29a and 29b. These sprags are arranged to be rocked into frictional driving engagement between the drive sleeve 28 and the clutch sleeve 29 only when the drive sleeve 28 is being rotated in a direction to wind the cable 24 on the drum 26. The sprags 31a are normally held in proximate alignment by a pair of continuous annular coil springs 31b passing through grooves 31c, 31c on the upper and lower faces of the sprags. This form of one-way clutch mechanism, including sprags 31a, is of a type well known in the art so further details thereof need not be described herein as it forms no part of the present invention.

The clutch sleeve 29 has a plurality of elongated, depending clutch teeth 32, 32, which clutch teeth 32 are adapted to be engaged in apertures 33, 33 formed in a clutch disc 34. The latter disc has vertical sliding movement along the clutch sleeve 29 above the sheave 22. Said clutch disc 34 has a plurality (in this case, two pairs, diametrically spaced, only one pair shown in Fig. 6) of clutch teeth 36 thereon adapted for engagement with a plurality of clutch teeth 37 on the lower face of the drum 26 when the clutch disc 34 is shifted to its extreme uppermost position through a suitable clutch shifting mechanism, which will hereinafter be more fully described.

The clutch sleeve 29 also has an annular collar 35 formed integrally therewith of slightly less diameter than the clutch teeth 37 on the lower face of the drum 26. A friction disc 39, loosely interposed in this case, is held between the collar 35 and the under face of the drum 26. The drum rests on, and is thus frictionally engaged with, the disc 39 at all times. With this arrangement, as will be seen, the resultant frictional engagement of the clutch sleeve 29 and the drum 26 serves to maintain take-up of sluing rope 24 at all times.

Yielding brake means are also provided for holding the drum against unwinding. In the form shown, this brake means consists of a friction pad 38 yieldably urged against the upper face of the drum as by a coil spring 40 in an auxiliary housing 41 mounted on the plate 42 and formed integrally with the main frame of the feeder head 16.

The positive clutch disc 34 is manually controlled through an operating lever 45 (Figs. 5 and 9) pivotally mounted on the top plate 42 of the feeder head frame and connected to a shifter fork 46 through a suitable linkage. Said linkage consists of a depending link 47 pivotally connected at its upper end to a bell-crank arm 48 of operating lever 45, and at its lower end to a rock arm 49 forming part of the U-shaped shifter fork 46. The latter fork includes a rod 50 pivoted on the main frame and a pair of arms 51 (see Figs. 6 and 9) fixed on said pivot rod in spaced relation to the first-named arm 49. The arm 49 carries a shifter member 52 intermediate its ends engaging in a groove 53 about the periphery of the clutch disc 34. The opposite arm 51 of the fork has a similar shifter member 54 engaged in the groove 53.

The linkage arrangement thus described is such to clutch and unclutch the positive clutch disc 34 with the drum 26 at the will of the operator.

Means are also provided for interlocking control of the positive clutch mechanism associated with the two winding devices on opposite sides of the feeder head. In the form shown herein, a transversely disposed tie rod 55 has its opposite ends pivotally connected to similar depending arms 56 fixed on the pivot rods 50 of each shifter fork 46. This interlocking mechanism permits control of the sluing mechanism by manipulating either one of the two operating levers 45, 45 at opposite sides of the machine, but insures unclutching of one drum whenever the other drum is in clutched engagement with its respective driving mechanism.

The use and operation of the sluing device may now be described as follows:

The shaker conveyor is set up in a mine room or entry 63 in suitable position for the loading of loose material 64 which is to be gathered in the usual manner by projecting the shovel 15 of extensible trough 14 beneath the loose material. The material is then moved along the conveyor 25 by a shaking motion to a suitable point of discharge, as for example the belt conveyor 61. Figures 10 and 11 illustrate one way in which the conveyor may be set up in a mine room or entry with the swivel or articulated joint 11 mounted on a base 11a which is anchored as usual to the mine floor by jacks 57, so as to permit the feeding device 13 to swing laterally for picking up loose material at various angular relations thereto, as desired. The sluing cables 24, 24 are anchored to suitable abutments or jacks at opposite sides of the loading head. In Figures 10 and 11 the lowermost sluing cable 24 is anchored to an abutment 24a at one rib or side wall of the mine room or entry 63 while the opposite sluing cable 24 is extended at any suitable angle to a similar anchor toward the opposite rib or side wall of the mine room or entry. The angles at which the sluing cables 24 extend from their respective winding drums 26 may be varied as required by different mining conditions.

When the conveyor as above described is being actuated with its customary shaker motion, the sluing device operates as follows:

When the grip blocks 19 of the feeder head 16 are positively engaged with the extensible trough 14 so that both the feeder head and the trough reciprocate in unison with each other, there is no relative movement between the cables 21 and the sheaves 22, 23, so that both winding drums 40 are inoperative, and are lightly held against rotation between friction pads 38 and friction ring 39. During such reciprocating movement of the extensible trough with the feeder head, the control levers 45 are normally shifted to an intermediate unclutching position, wherein both drums 26 are disconnected from their respective clutch discs 34.

When the grip blocks 19 are disengaged from the extensible trough during the forward stroke of the feeder head, the extensible trough tends to stand still due to its frictional contact with the ground, while the feeder head moves forwardly. This results in a retraction of the extensible trough with respect to the feeder head a distance substantially equal to the length of the forward stroke, in the usual manner. During such retracting movement of the extensible trough, both drive sleeves 28 will be rotated by the cables 21 in a direction to drive their respective clutch sleeves 29 through the one-way clutches 31. As long as the two clutch discs 34 are held in disengaged position, the drums 26 will not be positively driven through said clutch discs, but each of said drums is engaged with the friction discs 39 carried by the sleeves 35 on the clutch sleeves 29 to exert sufficient tension to overcome the holding tension of stationary friction pads 38, and thus rotate each of the drums in a direction to wind up any loose cable connected to said drums. It will be understood that the frictional effect of the disc 39 on the drum 26 will be greater than that of the pad 38 to facilitate the above-described winding of loose cable.

It will be understood, however, that the torque imposed upon the drums 26 through friction discs 39, in the manner just described, is only sufficient to wind in the sluing cables 24 and maintain them in fairly taut condition at opposite sides of the conveyor without exerting any substantial sluing action thereon or interfering with the normal reciprocating movement of the conveyor during its shaking motion.

When the grip blocks 19 on the feeder head are disengaged from the extensible trough during the return stroke of the feeder head so as to tend to extend the extensible trough relative to the feeder head in the usual manner, the one-way clutches 31 are released from driving engagement with the clutch sleeve 29 so that the drums are free from either positive or frictional drive connection. The stationary friction pads 38 hold the drums stationary under sufficient tension to resist unwinding of the drums 26.

When one or the other control lever 45 is actuated to engage the clutch by the clutch disc 34 and the drum on the right side of the conveyor, and the grip blocks 19 are disengaged from the extensible trough 14 on the forward stroke of the feeder head, the right drum is then positively driven through its respective one-way clutch 31 and the sheaves 22 and 23, are then being rotated by their cables 21, with the result that the right-hand sluing device 24 is forcibly wound upon its drum 26 to pull or slue the forward end of the conveyor toward the right. During this sluing motion, the left-hand drum is merely held taut by limited torsion acting through its friction disc 39.

If the control levers 45 are maintained in the same position as last described, and the grip blocks 19 are disengaged from the extensible trough 14 upon the return stroke of the feeder head, both one-way clutches 31 become disengaged so that neither positive nor limited frictional engagement occurs with respect to either of the winding drums, although said drums are held against unwinding by their respective friction pads 38.

The manipulation of the apparatus to slue the conveyor toward the opposite or left side is accomplished by shifting the interlocked clutch control mechanism through either control lever 45 so as to engage the left-hand clutch disc 34 with its respective drum 26. The right-hand drum 26 will be automatically disengaged by operation of the control interlock including tie rod 55. The mechanism is then in condition so that a positive winding action will be imparted to the left-hand drum whenever the grip blocks 19 on the feeder head are released from the extensible trough 14 during the forward stroke of the feeder head. The opposite or right-hand drum is then driven under limited frictional engagement from its friction disc 39 in a direction to take in slack cable thereon but under insufficient torque to interfere with the normal reciprocating movement of the conveyor. When the grip blocks 19 are disengaged from the extensible trough 14 on the return stroke of the feeder head, both the positive and frictional clutches on the left-hand drum are freed from operating by the one-way clutch 31, but the left-hand drum will be held against rotation only by its stationary pad 38.

From the description of the operation of my improved device, it will now be understood that one of the advantages of my improved sluing mechanism is that the two sluing drums are independently driven from the separate actuating devices, herein consisting of the cables 21, 21, so that the full force or power available during each retractive movement of the extensible trough relative to the feeder head is used for positive winding of either one of the drums for sluing the machine in one direction or the other, as desired.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In a shaker conveyor having a laterally swivelling reciprocable trough, an extensible trough telescopically mounted at the inby end of said reciprocable trough, and feeder mechanism for controlling relative telescopic movement of said troughs for extending or retracting said extensible trough during reciprocation of the other trough, the combination of a pair of winding drums mounted on one of said troughs, each having a flexible sluing cable thereon adapted for connection to a fixed abutment at one side of said conveyor, a rotatable drive member for each of said drums, means responsive to relative telescopic movement of said troughs for rotating each of said drive members, and clutch means affording positive driving connection between said drive members and their respective drums.

2. Apparatus in accordance with claim 1, wherein each of the rotatable drive members is driven by its rotating means through a one-way clutch.

3. Apparatus in accordance with claim 1, wherein each of said rotatable drive members also has limited frictional driving engagement with its respective drum.

4. Apparatus in accordance with claim 3, wherein each of said rotatable drive members is continuously in frictional driving engagement with its respective drum, regardless of whether or not its positive drive clutch means is operatively engaged with its drum.

5. Apparatus in accordance with claim 3, wherein each of said drums has yielding braking means tending to restrain rotation of said drums, but under limited tension permitting rotation of said drums when they are rotated by respective drive members either frictionally or in positive clutched engagement.

6. Apparatus in accordance with claim 5, wherein each of the rotatable drive members is driven by its rotating means through a one-way clutch.

7. Apparatus in accordance with claim 5, wherein each of said rotatable drive members is continuously in frictional driving engagement with its respective drum, regardless of whether or not its positive drive clutch means is operatively engaged with its drum.

8. Apparatus in accordance with claim 1, wherein the winding drums are mounted on the feeder mechanism, and the means responsive to relative telescopic movement of the troughs includes a pair of flexible feed cables anchored adjacent opposite ends of the extensible trough, and each frictionally engaged intermediate its ends with a drive sheave for one of the drive members.

9. Apparatus in accordance with claim 8, wherein the drive sheaves for the drive members each has a companion idler sheave geared thereto, and each of the flexible feed cables is trained in a reversed path about its drive sheave and its companion idler sheave to increase frictional driving engagement of said cables about their respective sheaves.

10. Apparatus in accordance with claim 9, wherein the feed cables have frictional driving engagement with their respective drive and idler sheaves on arcs of substantially more than 180 degrees of both sheaves.

11. In a flexible draft device of the character described, a reciprocably driven frame, a winding drum mounted on said frame having a flexible cable thereon adapted for connection to a fixed abutment remote from said frame, oscillable drive means on said frame, a drive member, a one-way clutch operatively connecting said drive means to said drive member during reciprocation of said frame in one direction, yieldable brake means on said frame normally engaging said winding drum under sufficient tension to resist unwinding of the cable thereon, friction drive means on said drive member normally engaging said drum for driving the latter under sufficient torque to overcome the braking action of said brake means when said drive member is rotated by said one-way clutch, positive clutch means for operatively engaging said drive member with said drum, and manual control means for engaging or disengaging said positive clutch means.

12. Apparatus in accordance with claim 11, wherein the brake means and said friction drive means engage said drum axially of the latter and in mutually opposed directions.

13. Apparatus in accordance with claim 11, wherein the oscillable drive means, the one-way clutch, the drive member, and the positive clutch means are all mounted concentrically with the drum.

14. Apparatus in accordance with claim 13, wherein the manual control means for the positive clutch means includes a clutch member slidably mounted on the drive member, and has continuous slidable drive connection with said drive member, and also has toothed drive connection with the drum when moved into clutched relation with the latter.

15. In a shaker conveyor having a laterally swivelable reciprocable trough, an extensible trough telescopically mounted at the inby end of said reciprocable trough, and feeder mechanism acting between said troughs for controlling extension and retraction of said extensible trough relative to said reciprocable trough during reciprocation of the latter, the combination of at least one winding drum mounted on one of said troughs, said drum having a flexible sluing cable thereon adapted for connection to a fixed abutment at one side of said conveyor, a rotatable drive member for said drum, means responsive to telescopic movement of said reciprocable trough relative to said extensible trough for rotating said drive member, and clutch means affording driving connection between said drive member and said drum.

ERNST R. BERGMANN.

References Cited in the file of this patent

UNITED STATES PATENTS

| Number | Name | Date |
|---|---|---|
| 2,043,747 | Getty | June 9, 1936 |
| 2,318,712 | Pratt | May 11, 1943 |
| 2,358,416 | Pratt | Sept. 19, 1944 |
| 2,362,844 | Nyborg | Nov. 14, 1944 |